(12) United States Patent
Howard

(10) Patent No.: US 7,182,193 B2
(45) Date of Patent: Feb. 27, 2007

(54) DRIVE DISCONNECT DEVICE

(75) Inventor: Rodney Stuart Howard, Hemel Hempstead (GB)

(73) Assignee: Goodrich Control Systems Limited, Shirley (GB)

(*) Notice: Subject to any disclaimer, the term of this patent is extended or adjusted under 35 U.S.C. 154(b) by 145 days.

(21) Appl. No.: 11/018,057

(22) Filed: Dec. 20, 2004

(65) Prior Publication Data
US 2005/0133331 A1 Jun. 23, 2005

(30) Foreign Application Priority Data
Dec. 22, 2003 (GB) ................. 0329703.3

(51) Int. Cl.
*F16D 11/04* (2006.01)
(52) U.S. Cl. .................... 192/69.2; 192/101
(58) Field of Classification Search ........... 192/69.2, 192/101
See application file for complete search history.

(56) References Cited

U.S. PATENT DOCUMENTS

| | | | |
|---|---|---|---|
| 3,001,620 A * | 9/1961 | Olchawa et al. ............. 192/24 |
| 4,042,088 A | 8/1977 | Schmohe | |
| 4,226,316 A | 10/1980 | Geisthoff | |
| 4,434,881 A * | 3/1984 | Denk et al. ............. 192/89.21 |
| 4,566,566 A | 1/1986 | Vuillet | |
| 4,685,550 A | 8/1987 | Metcalf | |
| 4,854,434 A | 8/1989 | Kurihara | |
| 4,915,200 A * | 4/1990 | Jacques et al. ............. 192/30 W |
| 4,936,247 A | 6/1990 | Sundstrom et al. | |
| 4,989,708 A | 2/1991 | Gaggermeier | |
| 4,993,533 A * | 2/1991 | Brown ................. 192/114 R |
| 4,997,072 A | 3/1991 | Lapthorne | |
| 5,031,740 A * | 7/1991 | Deichstetter et al. ......... 192/24 |

FOREIGN PATENT DOCUMENTS

| | | |
|---|---|---|
| FR | 2552251 | 3/1985 |
| FR | 2 558 281 A | 7/1985 |

OTHER PUBLICATIONS

Search Report dated May 27, 2004 from corresponding British Application No. GB 0329703.3.
Search Report from co-pending European Application No. EP 04 25 7679 mailed Apr. 6, 2006.

* cited by examiner

Primary Examiner—Richard M. Lorence
(74) Attorney, Agent, or Firm—Wolf, Greenfield & Sacks, P.C.

(57) ABSTRACT

A drive disconnect device is provided in which a drive transfer element (12) is axially movable with respect to input and output shafts (2, 14) so as to selectively disconnect them. A collar (50) is disposed in spaced apart configuration around the drive transfer element so that they do not touch except when the disconnect device is operated to disconnect the drive. When the disconnect operation is initiated, force is provided from a resilient element (56) to move the drive transfer element.

35 Claims, 4 Drawing Sheets

DRIVE DISCONNECT DEVICE

The present invention relates to a drive disconnect device. Such a device is suitable for controllably disconnecting a driven shaft from a drive shaft. The drive disconnect device is especially suited for controlled disconnection of a generator from a prime mover.

U.S. Pat. No. 4,997,072 discloses a disconnect device in which concentric input and output shafts are drivably connected by an intermediate element. A solenoid holds a spring operated non-rotating annular cam assembly in a retained position. The retraction of the solenoid allows the cam to slide into a position where a ramp on the cam engages with a rotating pin extending through a shaft of the drive assembly and moves the pin against a compression spring to a position where a stop carried on the pin moves out of engagement with the intermediate element thereby allowing the intermediate element to decouple the input and output shafts. Such an arrangement is difficult to test as the annular cam relies on the shafts to be rotating in order to give rise to the disconnect operation. Additionally it also requires introducing the rotating pin to a non-rotating ramp and this could give rise to the possibility of the sides of the ramp continually undergoing glancing contact with the pin and thereby preventing the cam assembly moving to the disconnect position.

U.S. Pat. No. 4,685,550 discloses an arrangement in which concentric input and output shafts are coupled together by an axially slidable drive connection element which is normally held in position by a detent mechanism. A magnetic coil encircles the output shaft and can be energised to attract an end plate which in turn is coupled to a cylindrical element disposed within one of the shafts to displace it axially such that a detent ball can fall into a pocket, thereby allowing the drive to become disconnected. The magnetic coil must provide the entirety of the force required to overcome any friction and the spring biasing of the detent mechanism; and the disengagement of the driving and driven elements depends upon there being sufficient torque transmitted there between to generate displacement forces acting between inclined jaws within a clutch mechanism. Such a mechanism may not always operate to disconnect a load. For example, in the context of an avionics generator, suspected failure of the generator may result in an immediate electrical disconnection of the device. Thus, apart from internal frictional losses, it will present no load to its drive device. Nevertheless, if failure is suspected it will still be desirable to drivingly disconnect the generator from the prime mover. The arrangement described in U.S. Pat. No. 4,685,550 may not be able to perform disconnect under these conditions since very little load is transmitted through disconnect device and hence very little axial force will occur between the inclined teeth.

U.S. Pat. No. 4,042,088 and U.S. Pat. No. 4,989,708 describe devices where drive is transferred between an input and an output shaft by a transfer element. The transfer element is held in place by a compression spring, and includes a worm gear arrangement on an outer edge. A second worm gear arrangement may be moved into contact with the worm gears on the transfer element, and the rotation of the element causes the element to move into a position where drive between the input and output shafts is disconnected. The devices require the shafts to be rotating in order to give rise to the disconnect operation and so are difficult to test.

U.S. Pat. No. 4,566,566 discloses a temporary disconnect mechanism for temporarily uncoupling the crank shaft of a loom from a drive motor and for enabling reconnection. In order to achieve this a clutch 3 having a tooth for engaging in a slot of a co-operating clutch plate is biased into an engaged position by a spring 8. An "energy storage spring" is arranged to act on a lever. The lever is normally held in a drive position by a pawl. In order to disconnect the clutch an electromagnet is energized so as to move the pawl away from the lever, thereby releasing the lever which moves under the urging of the "energy storage spring". A lever arm of the lever then acts against a control region of the movable clutch plate to disengage the clutch. The movable clutch plate continues to be driven by the drive motor after disconnection and also carries a cam such that, with each revolution the lever is returned to drive position, thereby re-establishing drive after one revolution of the clutch plate.

According to a first aspect of the present invention there is provided an aeronautical drive disconnect device for releasably connecting an output element to a drive element, comprising a drive transfer element movable between a first position where it drivingly connects the drive element to the output element, and a second position where there is no driving connection between the drive element and the output element, characterised in that a disconnect member is moveable under the action of a bias force provided by a biasing device to a disconnect position where the disconnect member is arranged to act against a first region of the drive transfer element so as to urge it to the second position.

It is therefore possible to provide a drive disconnect device in which a disconnect member urges the drive transfer element into a position where drive is not transferred. The drive can be disconnected irrespective of whether there is any drive or torque being applied to or transferred through the device.

Preferably the biasing device comprises a resilient member, such as a spring, which urges the disconnect member to move into engagement with the drive transfer element, and then urges the drive transfer element to move to the second position. This is advantageous since the force to operate the disconnect mechanism is stored in a passive device and hence there will always be a supply of force and energy available from the passive device to operate the disconnect mechanism, irrespective of the status of pneumatic, hydraulic or electrical systems associated with the disconnect system.

The biasing device is preferably a crest to crest spring. Such springs are available from SMALLEY STEEL RING COMPANY, USA. However dish springs, coil springs and wave springs may also be used.

Preferably the disconnect element is releasably retained by locking means in an "armed" position from where it can be released to initiate the disconnect of the input and output shafts from one another.

Preferably the disconnect member is in the form of an annular ring or hollow cylinder arranged coaxially with the drive transfer element, thereby ensuring an even distribution of the force around the first region of the drive transfer element. The locking means is preferably a locking pin which extends into a recess in the side of the disconnect member, and is retracted in order to release the disconnect member.

Advantageously the disconnect member is prevented from rotation, even after moving to the disconnect position. This is preferably achieved by providing an axially-extending groove in the disconnect member in which an end of the locking pin remains after being retracted. This facilitates resetting of the drive disconnect device after testing, since the locking pin is maintained in a path that guides it into alignment with the recess in the disconnect member.

Preferably the surface area of contact between the disconnect member and the drive transfer element is minimized in order to reduce friction between them. This reduces wear and also reduces torque transfer from the drive transfer element to the disconnect member during operation of the disconnect device.

Preferably the disconnect member is positioned concentrically around at least part of the drive transfer element. The drive transfer element preferably has a region of increased radius so that there is some radial overlap between the drive transfer element and the disconnect member, and they can come into abutment when one is slid axially relative to the other.

Preferably the input and output elements are input and output shafts, respectively.

Preferably the drive transfer element is in splined engagement with the output shaft. Thus the drive transfer element can slide relative to the output shaft.

Preferably when the drive transfer element is at its first position, the drive shaft and drive transfer element are drivably connected via drive dogs situated on co-operating faces of the element and drive shaft. When the drive transfer element is in the second position, the drive dogs are disconnected such that drive is no longer transferred from the drive shaft to the drive transfer element.

Advantageously the splines and/or dogs are angled such that when torque is being transferred through the device, the drive transfer element is gently biased towards the first position.

According to a second aspect of the present invention there is provided a disconnect arrangement comprising an input element, an output element, a drive transfer element and a disconnect-element, wherein the input and output elements are coaxially arranged and the drive transfer element is movable in an axial direction between a first position where the input and output elements are drivingly connected and a second position where there is no driving connection between the input and output elements, and the drive transfer element has a uniform load bearing surface which is inclined with respect to the axial direction such that movement of the disconnect element in a disconnect direction which is parallel with the axial direction or which has a component of motion along the axial direction causes the disconnect element to abut the load bearing surface of the drive transfer element, and the disconnect element is urged to engage with the drive transfer element and to move it to the second position by a biasing means.

According to a third aspect of the present invention, there is provided a generator including a drive disconnect device as claimed in the first or second aspect of the present invention.

The invention will now be described, by way of example only, with reference to the accompanying drawings, in which.

Figure 1:
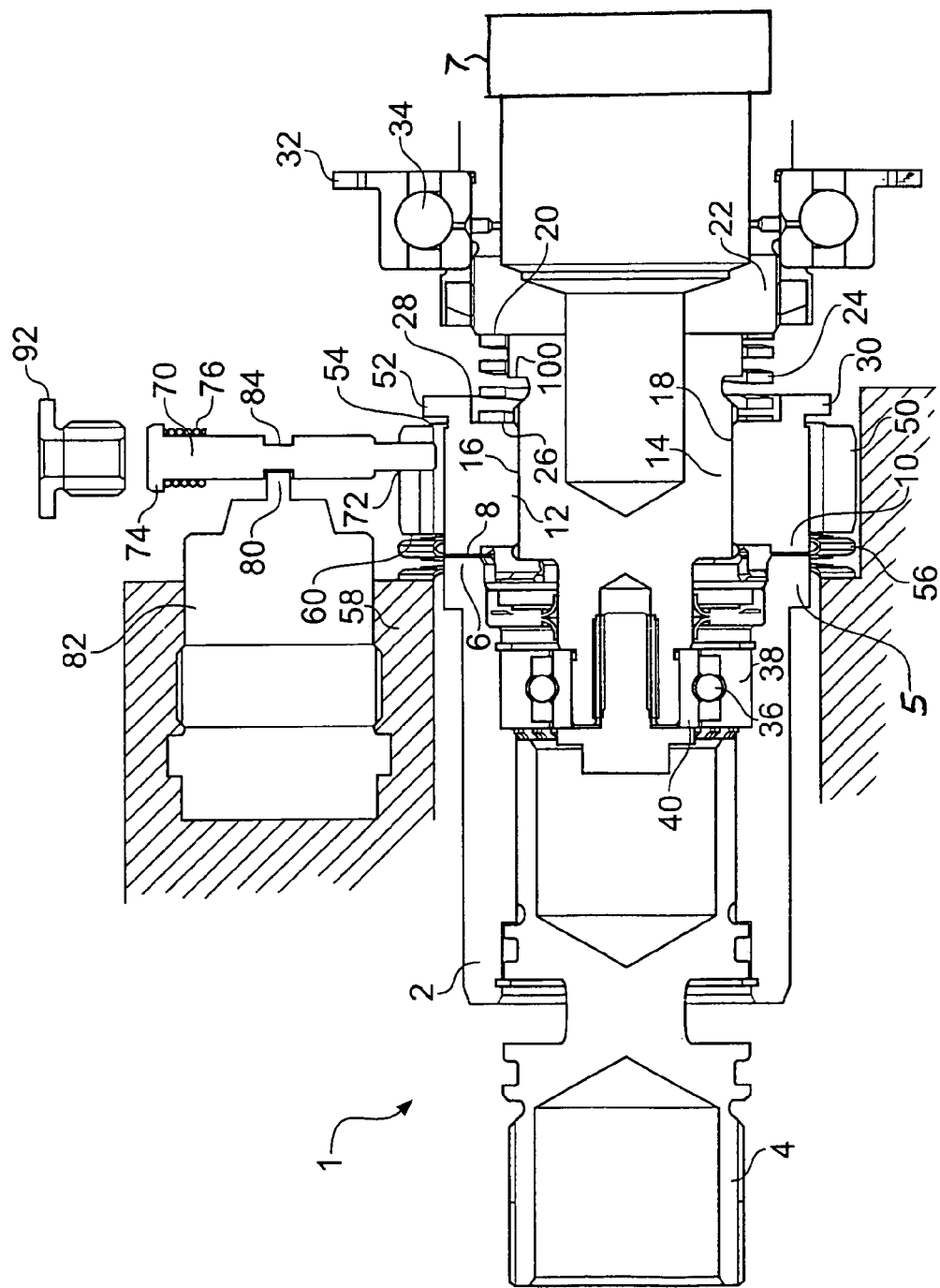
FIG. 1 shows a cross-section of an embodiment of the invention, when the input and output shafts are drivingly connected.

FIG. 1 illustrates an embodiment of a drive disconnect device, generally designated 1, in which an input shaft 2 is in splined engagement with a quill shaft 4 which provides driving connection to a prime mover (not shown) such as an aircraft engine. The input shaft 2 has, at a first end 5 thereof remote from the quill shaft 4, a castellated end face which forms drive dogs 6. The disconnect device can be used to supply motive power to an aeronautical generator 7. The disconnect device allows drive to the generator to be removed in the event of a generator malfunction.

The drive dogs 6 are releasably engagable with cooperating drive dogs 8 provided at a first end 10 of an annular drive transfer element 12. The drive transfer element 12 is coaxially disposed around an output shaft 14. The drive dogs may be slightly angled with respect to the axis of rotation of the input shaft such that torque transfer in a predetermined direction of rotation gently urges the drive transfer element and input element into engagement with one another.

The drive transfer element 12 also carries a plurality of axial splines 16 around an inner surface of the element 12. The splines 16 engage with corresponding splines 18 situated around an outer circumference of the output shaft 14. The splines 16 and 18, are arranged such that the drive transfer element 12 can be axially displaced with respect to the output shaft 14 whilst being held against rotation with respect to the output shaft 14.

The output shaft 14 has an annular shoulder 20 formed on a region 22 of increased diameter at a second end thereof against which one end of a helical compression spring 24 abuts. The opposite end of the spring 24 abuts a face 26 within an annular recess 28 at the second end 30 of the drive transfer element 12. The spring 24 is disposed coaxially around part of the output shaft 14, and is arranged such that the drive transfer element 12 is urged towards the input shaft 2 such that the drive dogs 6 and 8 tend towards the engaged position. Thus the spring 24 acts to maintain the drive transfer element 12 at its first position so that torque is transferred from the input shaft 2 to the output shaft 14 via the drive dogs 6 and 8, drive transfer element 12 and the splines 16 and 18.

The splines 16 and 18 may also be angled slightly with respect to the axis of the disconnect device such that torque transfer in a predetermined direction gently urges the drive transfer element 12 towards the input shaft 2 so as to further urge the drive dogs 6 and 8 into engagement.

The output shaft is rotatably supported with respect to a stator or housing 32 by bearings 34. Similarly the input shaft 2 is rotatably supported around the output shaft 14 by a bearing 36 disposed between bearing races 38 and 40.

The drive disconnect device 1 also includes an annular collar 50 disposed coaxially around part of the drive transfer element 12 but spaced apart from the drive transfer element 12 such that it does not contact the element 12 when the collar 50 is in the "armed" position illustrated in FIG. 1. This is important as it gives a long service life to the disconnect mechanism as there is little or no wear when it is in the "armed" position. The drive transfer element 12 has a annular flange 52, presenting a face perpendicular to the axis of rotation, on the opposite end to the drive dogs 6, which extends radially past the innermost portion of the collar 50. Thus there is some radial overlap of the collar 50 and the flange 52. The collar includes a thin annular lip 54 on the end facing towards the flange 52 and which is positioned substantially around the inner circumference of the collar 50. The lip 54 extends slightly axially beyond the main body of the collar 22 towards the flange 52.

A spring 56, such as a "crest to crest" spring, is disposed concentrically around the input shaft 4 and extends between a non-rotating support 58, which may be part of a housing for the disconnect device, and an end face 60 of the annular collar 50 remote from the end having the lip 26. The spring 56 is maintained in compression such that it urges the collar 50 towards the flange 52 of the drive transfer element 12. The collar 50 is slidably mounted within the drive disconnect device 1, such that it can slide axially. However it is held in place by a locking pin 70 which engages with a hole or recess 72 in the collar 50. The locking pin 70 includes an enlarged head 74 against which a spring 76 acts to urge the locking pin 70 to move out of engagement with the drive transfer element.

Although the spring 76 acts to urge the end of the pin 70 out of the hole 72 in the collar 50, the locking pin 70 is held in the place, as shown in FIG. 1, by a projection 80 attached to the armature of, or otherwise moved by, a solenoid 82 which is maintained in a position where it is inserted into an annular groove 84 in the locking pin 70. Thus the projection 80 prevents the locking pin 70 from moving out of the hole 72 under the force of the spring 76.

When the solenoid 82 is activated, the projection 80 moves away from the locking pin 70. The pin 70 becomes free to move with respect to the to the collar 50, thereby allowing the collar 50 to be moved in response to the force exerted by the spring 56.

Figure 2:
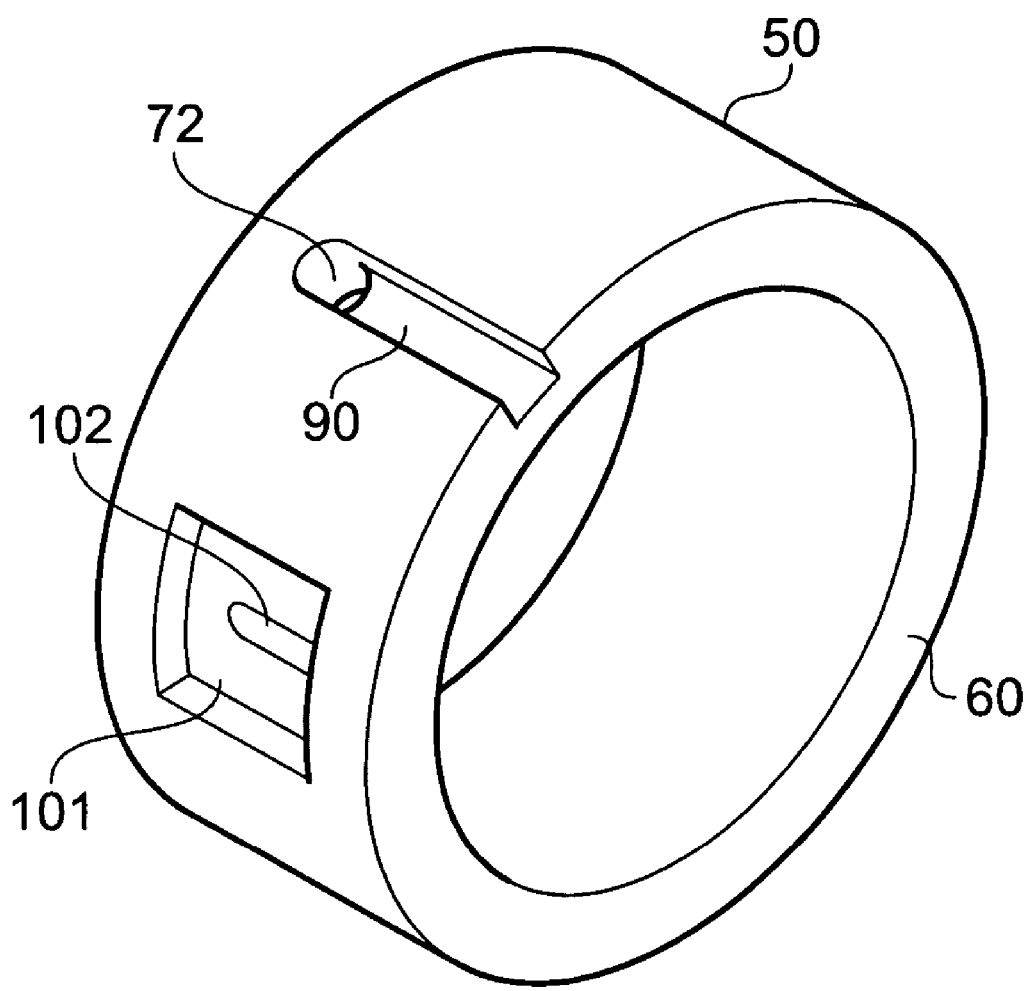
FIG. 2 shows a perspective view of a slidable collar constituting part of the embodiment.

FIG. 2 shows a perspective view of the collar 50. The collar 50 further comprises a further axial groove 90 in its outer surface. This groove 90 extends from the hole 72 to the end face 60 of the collar 50. The depth of the groove 90 is less than that of the hole 72. The hole 72 and groove 90 co-operate to form an L-shaped cavity in the otherwise annular collar 50. There is also provided a recess 101 which is, in this example, rectangular and which engages with a reset mechanism which will be described later.

When it is desired to disconnect the drive transfer between the input shaft 2 and, output shaft 14, the solenoid 82 is activated so as to withdraw the protrusion 80 out of the groove 84.

Figure 3:
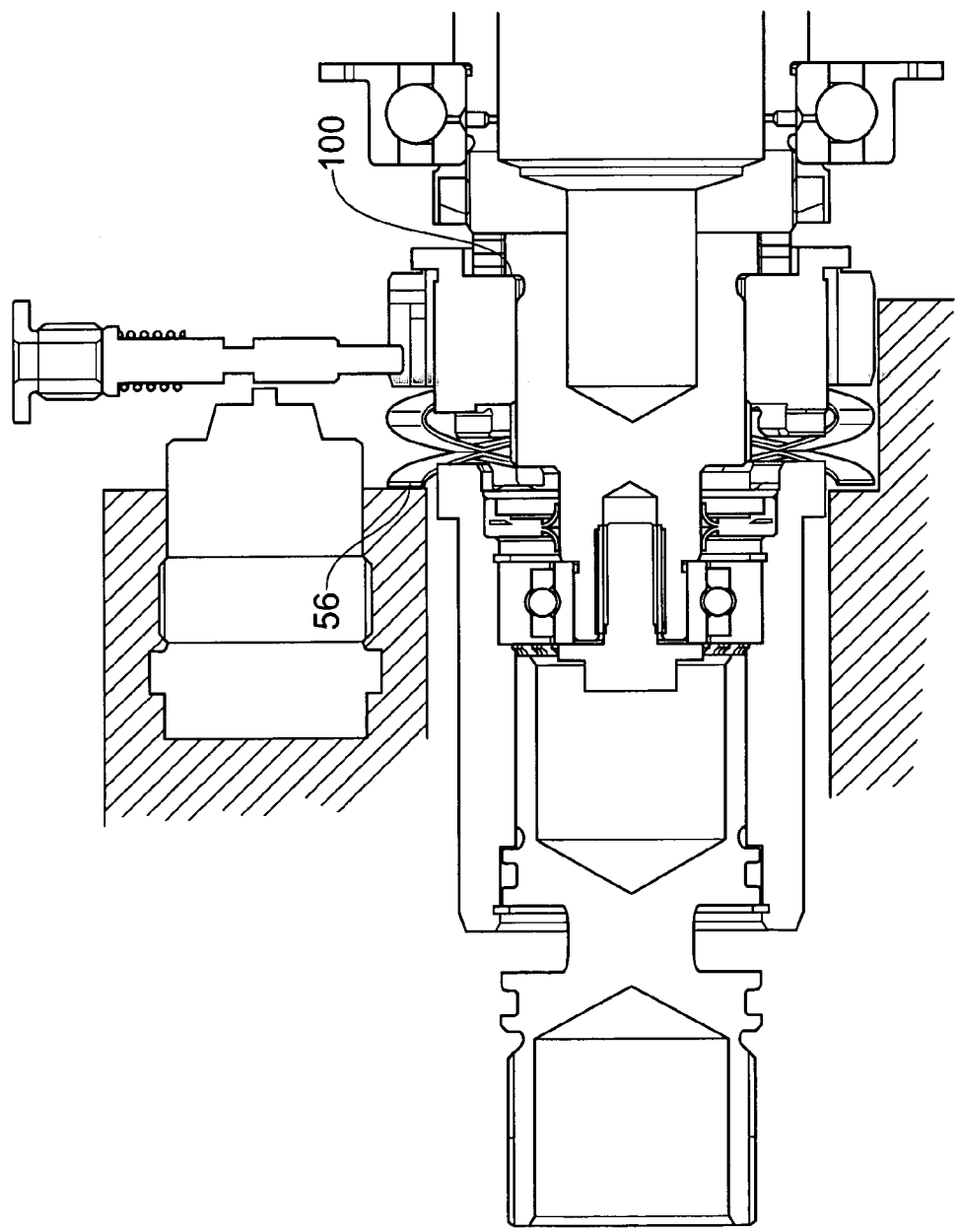
FIG. 3 shows a cross-section of the embodiment, after it has been activated to disconnect the input shaft from the output shaft.

Once the protrusion 80 has so moved, the force of the spring 76 moves the locking pin radially outward relative to the collar 50. The distance the locking pin 70 travels is restricted by a fixed abutment 92, shown in FIGS. 1 and 3, against which a head 74 of the locking pin abuts when in the withdrawn position (FIG. 3). The abutment 92 is positioned such that the locking pin 70 moves out of the hole 72 in the collar 50, but remains within the axial groove 90. As a result, the collar 50 is then able to slide axially with the end of the pin 70 moving along the groove 90, but the collar 50 is prevented from rotating by virtue of the locking pin 70 interacting with the groove 90. This feature protects the spring 56 which may be damaged by relative rotation of the collar 50 and the support 58 which it abuts and between which it resides.

Once the locking pin 70 has moved out of the hole 90 in the collar 50, the spring 56 pushes the collar 50 axially towards the flange 52 of the drive transfer element 12. The lip 54 of the collar 50 comes into contact with the flange 52, such that force from the spring 56 can be transmitted to the drive transfer element 12.

The drive transfer element 12 is usually urged towards the first position (in which it transfers drive between the input and output shafts 2 and 14) by a force exerted by the spring 24 and any axial force that may arise due to the angle of the splines 16,18, or the angles on the faces of the drive dogs 6 and 8 and the torque transferred from the drive transfer element 12 to the output shaft 14. The spring 56 exerts a force which overcomes the abovementioned force(s), as well as any friction of the collar 50 or the drive transfer element 12. Therefore, the lip 54 of the collar 50 contacts the flange 52 of the drive transfer element 12, and both the collar 50 and the drive transfer element 12 are urged away from the input shaft 2 thereby removing the driving engagement between the dogs 6 and 8.

The movement of the drive transfer element 12 is halted by an annular shoulder 100 on the output shaft 14, as shown in FIGS. 1 and 3. Therefore the drive transfer element 12 is pushed to the second position as shown in FIG. 3. The splines 16 and 18 are dimensioned such that they remain inter-engaged when the drive transfer element has moved to its second position, thereby ensuring that the disconnect device can be reset after testing.

The drive transfer element 12 and output shaft 14 may continue to rotate for a time after the element 12 has moved to the second position, if the input shaft had been supplying rotational drive when the element 8 was in the first position. Therefore there is relative rotational movement between the lip 54 on the collar 50 and the flange 52 of the drive transfer element 12. The lip 54 and the flange 52 remain in contact due to the force exerted by the spring 56. Therefore the contacting surfaces are arranged such that there is little friction between the lip 54 and the flange 52, in order to reduce wear. This is achieved by ensuring that the lip 54 has a small surface area which contacts the flange 52.

Also, the contacting surfaces on the lip 54 and/or flange 52 may be coated with a low-friction and/or hard-wearing material.

The relative motion between the collar 50 and the drive transfer element 12 tends to transfer torque from the element 12 to the collar 50, despite the low friction of the contacting surfaces. The collar 50 is prevented from rotating by the presence of the locking pin 70, the end of which remains in the groove 90 in the collar 50 as shown in FIG. 3. This protects the spring 56 as explained above.

Because the movement of the drive transfer element 12 from the first to the second position is caused by the spring 56, the movement of the locking pin 70 is caused by the spring 76, and the movement of the protrusion 80 holding the locking pin 70 in place is caused by the solenoid 80, no drive needs to be applied to the input shaft in order to activate the drive disconnect device of the present invention, and to disconnect the transfer of drive between the input and output shafts 2 and 14. Therefore the drive disconnect device may operate in the absence of an input drive. This is advantageous when testing the device, as in the example of an aircraft generator the drive can be tested on the ground without the engines (which supply the input drive) running by operating the solenoid. After the disconnect mechanism has operated, the drive remains disconnected irrespective of further rotation of the input or output shafts.

Figure 4:
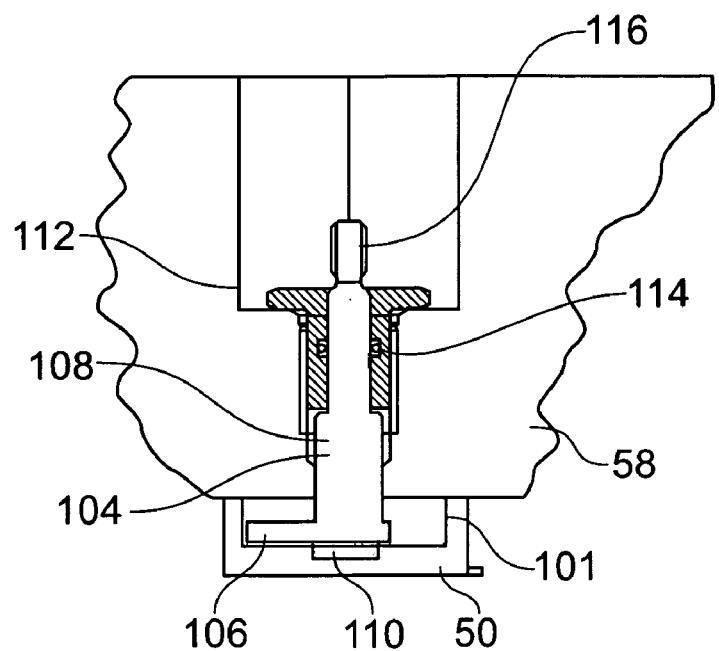
FIG. 4 is a side view of a reset mechanism.

If an engineer has tested operation of the drive disconnect device, it is advantageous that it can be easily and reliably returned to the operating state. As noted earlier, the collar 50 is provided with a further recess 101 which, as shown in FIG. 2, may also be provided with an elongate groove 102 formed in the base of the recess 101. This groove 102 and the recess 101 co-operate with a reset device illustrated in FIG. 4. The reset device 104 comprises and eccentric cam 106 mounted at the first end of a shaft 108. A small portion 110 of the shaft 108 may extend beyond the eccentric cam 106 to engage within the groove 102. This engagement with the groove 102 is not strictly necessary but helps to protect the shaft 108 against distortion or unwanted motion due to the lateral forces which may be exerted on it during operation of the reset mechanism. The shaft 108 is rotatably supported within a recess 112 in the housing or a support element of the disconnect mechanism by a bush 114. A second end of the shaft 108 is formed with a head 116 which is configured to co-operate with a tool for turning the shaft 108.

Figure 5:
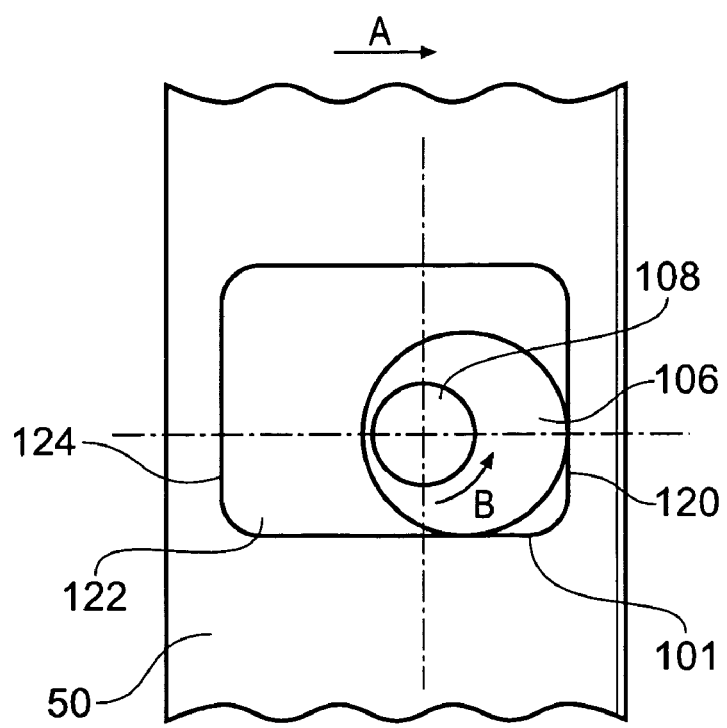
FIG. 5 shows how the reset mechanism engages with the slidable collar.

In use, and as shown in FIG. 5 the eccentric cam 106 is offset to extend towards a first sidewall 120 of the recess 101 such that a clear space 122 exists between the cam and a further side wall 124 of the recess 101. In this configuration, the collar 50 can move in the direction of the arrow A until such time as the space 122 reduces. Thus this space allows the collar 50 to move away from the input shaft 2 and hence to operate the disconnect mechanism. Once the disconnect mechanism is operated, it becomes necessary to reset it by displacing the collar 50 in the direction anti-parallel to the arrow A This can be achieved by rotating the shaft 108 by half a revolution in the anticlockwise direction, as indicated by arrow B in FIG. 5. This causes the cam 106 to act against the end wall 124 thereby returning the collar 50 to its initial position. Once the collar has moved to its initial position the engineer can push the pin 70 against the urging of the spring 76 to reengage it within the recess 72 in the collar 50. With the solenoid 82 de-energised, the projection 80 will snap back into the annular groove 84 thereby holding the pin 70 locked in the position shown in FIG. 1. Once this has been achieved the tool may be released from engagement with the end 116 of the shaft 108. A torsional spring (not shown) biases the shaft 108 to rotate back to the position shown in FIG. 5 thereby causing the reset mechanism to return to its initial condition, thereby ensuring that it does not inhibit operation of the drive disconnect device.

Although the flange 52 has an end face which is perpendicular to the axis of rotation of the input element, and the collar 50 slides parallel to the axis of rotation other disconnect systems can be envisaged where the collar or some other driving element does not move strictly parallel with the axis of rotation but does have some motion, be it translational or rotary, which gives rise to some movement which has a component of movement parallel to the axis of rotation. Similarly the surface on the flange 54 may be inclined to the axis of rotation, it being sufficient that it present a surface against which an operating element can abut to impart an axial force to the drive transfer element 12 to cause it to move to the disconnect position.

The invention claimed is:

1. An aeronautical drive disconnect device for releasably connecting an output element to a drive element, comprising a drive transfer element movable between a first position where it drivingly connects the drive element to the output element, and a second position where there is no driving connection between the drive element and the output element, wherein a disconnect member is moveable under the action of a bias force provided by a biasing device to a disconnect position where the disconnect member is arranged to act against a first region of the drive transfer element so as to urge it to the second position, wherein the disconnect member can, in use, move the drive transfer element to the second position when the drive element is not rotating.

2. A drive disconnect device as claimed in claim 1, wherein the disconnect member acts directly on the drive transfer element.

3. A drive disconnect device as claimed in claim 1, wherein the disconnect member can, in use, move the drive transfer element to the second position irrespective of the load or torque being transferred through the drive disconnect device.

4. A drive disconnect device as claimed in claim 1, wherein the disconnect member comprises an annular collar disposed around at least one of the drive element, the output element and the drive transfer element.

5. A drive disconnect device as claimed in claim 1, wherein the disconnect member is arranged to move towards and to abut the drive transfer element in order to move it from the first position to the second position.

6. A drive disconnect device as claimed in claim 1, wherein the biasing device is a spring and the disconnect member is urged into engagement with the drive transfer element by at spring.

7. A drive disconnect device as claimed in claim 1, wherein the disconnect member is held in place by a locking device which is released in order to move the drive transfer element from the first position to the second position.

8. A drive transfer element as claimed in claim 4, wherein the disconnect member is held in place by a locking pin which extends into a hole in the annular collar and is released in order to move the transfer element from the first position to the second position.

9. A drive disconnect device as claimed in claim 8, in which when the locking pin is withdrawn, an end of the pin remains within an axial groove in the annular collar so as to permit the collar to axially slide but to prevent rotation of the collar.

10. A drive disconnect device as claimed in claim 8, wherein the locking pin is biased towards a position where the annular collar is released, and is held in place by a holding device until the drive transfer element device is to be moved from the first position to second position.

11. A drive disconnect device as claimed in claim 10, wherein the holding device comprises a locking element which is moved by a solenoid in order to release the locking pin.

12. A drive disconnect device as claimed in claim 1, in which the drive transfer element is biased towards the first position.

13. A drive disconnect device as claimed in claim 1, wherein the drive transfer element is coaxially disposed around the output element and is in splined engagement therewith such that the drive transfer element is axially slidable on the output element.

14. A drive disconnect device as claimed in claim 1, wherein the drive transfer element includes a flange against which the disconnect member acts during motion of the disconnect element to the second position.

15. A drive disconnect device as claimed in claim 1 in which, once the disconnect member has moved to the disconnect position the drive between the drive element and the output element remains disconnected irrespective of the further motion of the drive element and the output element.

16. A drive disconnect device as claimed in claim 1, further comprising a reset device for moving the disconnect member away from the disconnect position.

17. A drive disconnect device as claimed in claim 16, wherein the reset device comprises an eccentric cam for engaging with the disconnect member whereby rotation of the eccentric cam urges the disconnect member away from the disconnect position.

18. A generator in combination with a drive disconnect device as claimed in claim 1.

19. An aeronautical drive disconnect device for releasably connecting an output element to a drive element, comprising a drive transfer element movable between a first position where it drivingly connects the drive element to the output element, and a second position where there is no driving connection between the drive element and the output element, wherein a disconnect member is moveable under the action of a bias force provided by a biasing device to a disconnect position where the disconnect member is arranged to act against a first region of the drive transfer element so as to urge it to the second position, wherein the disconnect member comprises an annular collar disposed coaxially around at least one of the drive element, the output element and the drive transfer element.

20. A drive disconnect device as claimed in claim 19, wherein the disconnect member acts directly on the drive transfer element.

21. A drive disconnect device as claimed in claim 19, wherein the disconnect member is arranged to move towards and to abut the drive transfer element in order to move it from the first position to the second position.

22. A drive disconnect device as claimed in claim 19, wherein the biasing device is a spring.

23. A drive disconnect device as claimed in claim 19, wherein the disconnect member is held in place by a locking device which is released in order to move the drive transfer element from the first position to the second position.

24. A drive transfer element as claimed in claim 19, wherein the disconnect member is held in place by a locking pin which extends into a hole in the annular collar and is released in order to move the transfer element from the first position to the second position.

25. A drive disconnect device as claimed in claim 24, in which when the locking pin is withdrawn, an end of the pin remains within an axial groove in the annular collar so as to permit the collar to axially slide but to prevent rotation of the collar.

26. A drive disconnect device as claimed in claim 24, wherein the locking pin is biased towards a position where the annular collar is released, and is held in place by a holding device until the drive transfer element device is to be moved from the first position to second position.

27. A drive disconnect device as claimed in claim 26, wherein the holding device comprises a locking element which is moved by a solenoid in order to release the locking pin.

28. A drive disconnect device as claimed in claim 19, in which the drive transfer element is biased towards the first position.

29. A drive disconnect device as claimed in claim 19, wherein the drive transfer element is coaxially disposed around the output element and is in splined engagement therewith such that the drive transfer element is axially slidable on the output element.

30. A drive disconnect device as claimed in claim 19, wherein the drive transfer element includes a flange against which the disconnect member acts during motion of the disconnect element to the second position.

31. A drive disconnect device as claimed in claim 19, in which, once the disconnect member has moved to the disconnect position the drive between the drive element and the output element remains disconnected irrespective of the further motion of the drive element and the output element.

32. A drive disconnect device as claimed in claim 19, further comprising a reset device for moving the disconnect member away from the disconnect position.

33. A drive disconnect device as claimed in claim 32, wherein the reset device comprises an eccentric cam for engaging with the disconnect member whereby rotation of the eccentric cam urges the disconnect member away from the disconnect position.

34. A generator in combination with a drive disconnect device as claimed in claim 19.

35. An aeronautical drive disconnect device for releasably connecting an output element to a drive element, comprising a drive transfer element movable between a first position where it drivingly connects the drive element to the output element, and a second position where there is no driving connection between the drive element and the output element, wherein a disconnect member is moveable under the action of a bias force provided by a biasing device to a disconnect position where the disconnect member is arranged to act against a first region of the drive transfer element so as to urge it to the second position, further comprising a reset device for moving the disconnect member away from the disconnect position, wherein the reset device comprises an eccentric cam for engaging with the disconnect member whereby rotation of the eccentric cam urges the disconnect member away from the disconnect position.

* * * * *

UNITED STATES PATENT AND TRADEMARK OFFICE
CERTIFICATE OF CORRECTION

| | |
|---|---|
| PATENT NO. | : 7,182,193 B2 |
| APPLICATION NO. | : 11/018057 |
| DATED | : February 27, 2007 |
| INVENTOR(S) | : Rodney Stuart Howard |

It is certified that error appears in the above-identified patent and that said Letters Patent is hereby corrected as shown below:

<u>Column 8</u>
Claim 6, line 15, delete "at", insert --the--.

Signed and Sealed this

First Day of May, 2007

JON W. DUDAS
*Director of the United States Patent and Trademark Office*